(12) United States Patent
Symons

(10) Patent No.: US 7,166,668 B2
(45) Date of Patent: Jan. 23, 2007

(54) METHOD OF MAKING A FINISHED PRODUCT

(75) Inventor: Michael Windsor Symons, Pretoria (ZA)

(73) Assignee: Tower Technology Holdings (Pty) Ltd., Pretoria (ZA)

( * ) Notice: Subject to any disclaimer, the term of this patent is extended or adjusted under 35 U.S.C. 154(b) by 0 days.

(21) Appl. No.: 10/497,796

(22) PCT Filed: Dec. 4, 2002

(86) PCT No.: PCT/IB02/05100

§ 371 (c)(1),
(2), (4) Date: Jun. 7, 2004

(87) PCT Pub. No.: WO03/048238

PCT Pub. Date: Jun. 12, 2003

(65) Prior Publication Data

US 2005/0020747 A1    Jan. 27, 2005

(30) Foreign Application Priority Data

Dec. 5, 2001 (ZA) .............................. 2001/10001
Feb. 18, 2002 (ZA) .............................. 2002/1346
Jun. 5, 2002 (ZA) .............................. 2002/4495

(51) Int. Cl.
*C08J 5/00* (2006.01)
*C08K 3/26* (2006.01)
*C08L 51/00* (2006.01)
*C08G 18/42* (2006.01)
*B29C 43/00* (2006.01)

(52) U.S. Cl. ............ 524/539; 264/331.21; 264/331.13; 264/500; 264/519; 264/531; 264/548; 428/365; 428/402; 428/407; 428/430; 428/431; 524/425; 524/427; 524/445; 524/448; 524/449; 524/451; 524/492; 524/493; 524/494

(58) Field of Classification Search ................ 264/500, 264/519, 531, 548, 331.13, 331.21; 428/365, 428/402, 407, 430, 431; 524/425, 427, 445, 524/448, 449, 451, 492, 493, 494, 539
See application file for complete search history.

(56) References Cited

U.S. PATENT DOCUMENTS

| 3,786,004 | A |   | 1/1974 | Adachi et al. |
| 4,515,633 | A | * | 5/1985 | Cruz, Jr. .................. 106/18.26 |
| 4,727,096 | A |   | 2/1988 | Choudin |
| 5,895,790 | A |   | 4/1999 | Good |
| 5,932,641 | A |   | 8/1999 | Trouve et al. |
| 5,952,416 | A | * | 9/1999 | Tani et al. .................. 524/413 |

FOREIGN PATENT DOCUMENTS

| EP | 0 331 507 | 9/1989 |
| EP | 0 747 444 | 12/1996 |
| FR | 2 682 117 | 4/1993 |
| GB | 936 351 | 9/1963 |

\* cited by examiner

*Primary Examiner*—Patrick D. Niland
(74) *Attorney, Agent, or Firm*—Young & Thompson

(57) ABSTRACT

A method of making a finished product includes the steps of providing a feedstock comprising a polymer component comprising 5 to 100 parts by weight of a polymer selected from the group consisting of polyethylene in particulate form, polyvinyl chloride in particulate form, and a mixture of polyethylene and polyvinyl chloride both in particulate form; 0 to 95 parts by weight of polystyrene in particulate form; an extender, and optionally reinforcing fibres or particles; mixing the feedstock with a thermosetting resin selected from an unsaturated polyester resin in liquid form and a catalyst for the polyester resin and an epoxy resin in liquid form and a catalyst for the epoxy resin; and subjecting the product to suitable conditions of temperature and pressure to cause the polyethylene and/or the polyvinyl chloride and the polystyrene, if present, to melt and the thermosetting resin to set to form the finished product, e.g a shutter board.

20 Claims, 4 Drawing Sheets

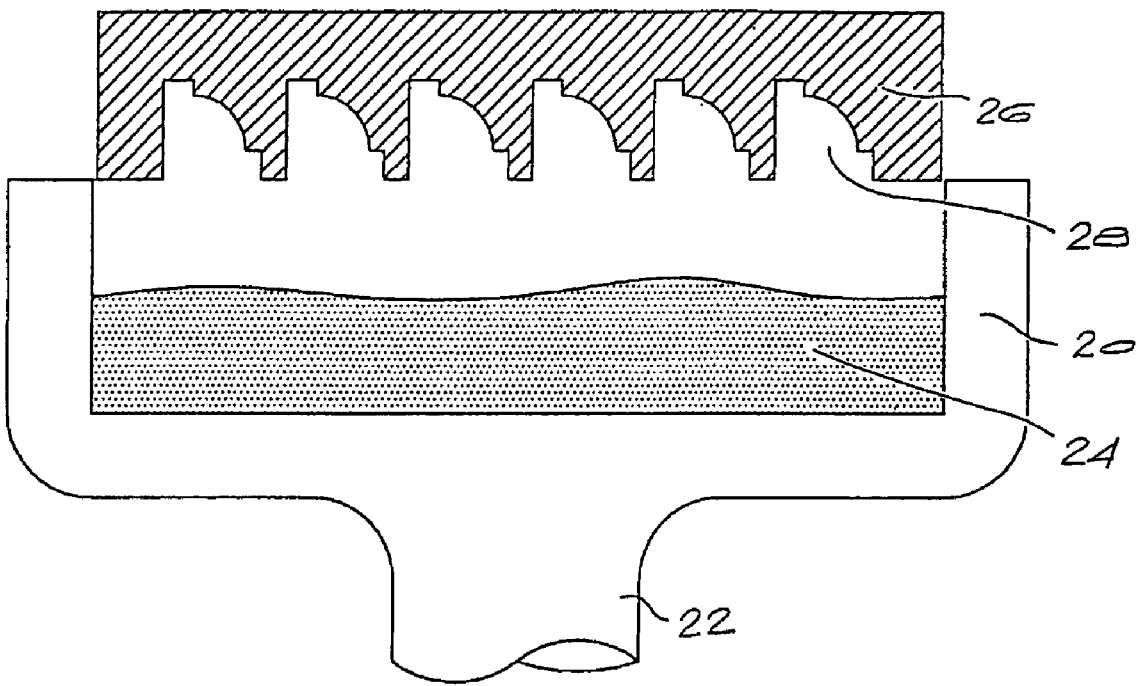
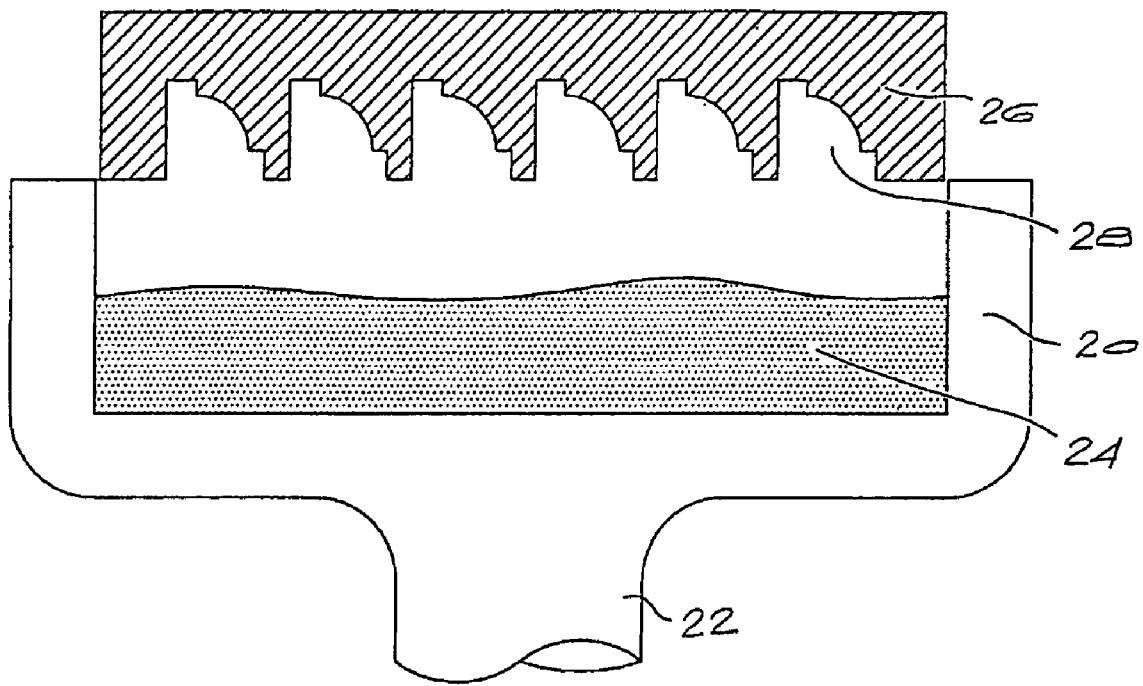
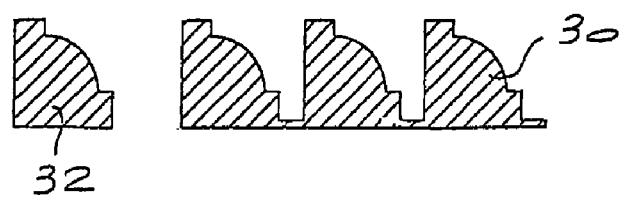
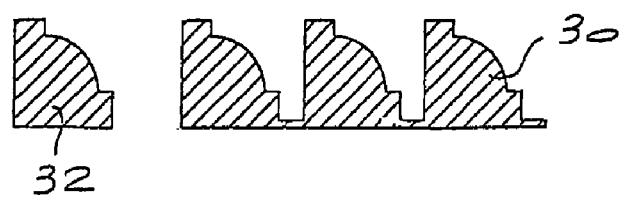

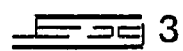
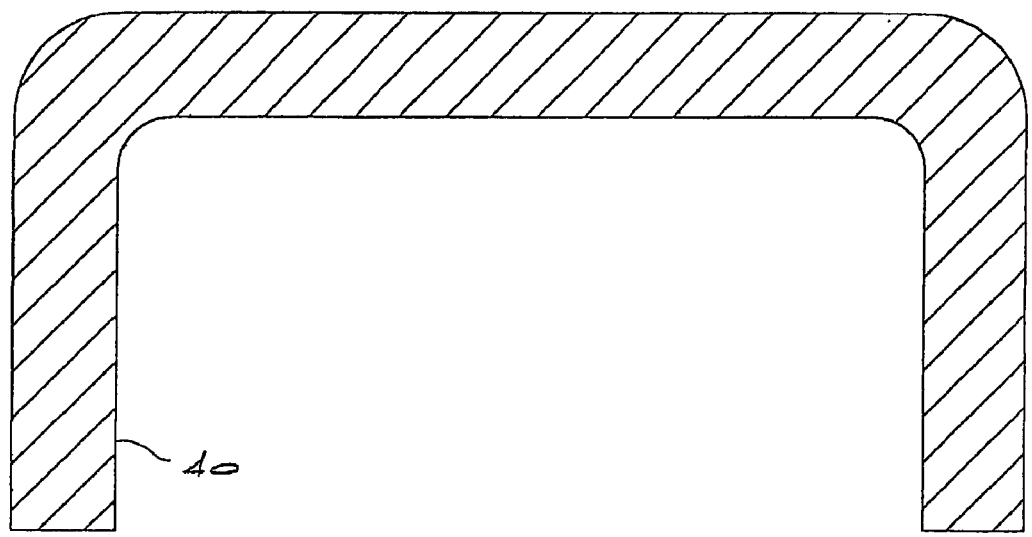
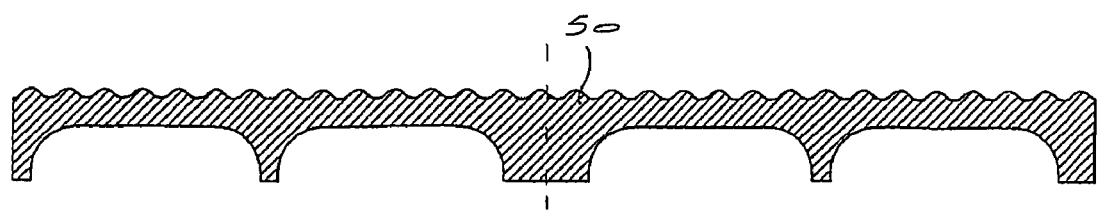

METHOD OF MAKING A FINISHED PRODUCT

BACKGROUND OF THE INVENTION

This invention relates to a method of making a finished product and to the finished product so made.

It is well known to use wood and wood products to manufacture many different types of finished products. For example, wood fibres may be used to mould door skins, solid wood may be used to make mouldings, window, frames, wall studding, decking, roof support rafters and brandering, plywood may be used for bulk handling bins, and the like. In addition, certain plastic materials may also be used to make structural items. For example, polyvinyl chloride may be used for the construction of sidings and window frames.

However, with the modem requirement for recyclability and the tendency for wood products to absorb water which results in thickness swell as well as microbial growth and a reduction in strength, there is a need for new products to replace such wood products.

SUMMARY OF THE INVENTION

According to a first aspect of the invention there is provided a method of making a finished product including the steps of:
  (a) providing a feedstock comprising:
    (1) 10 to 40 parts by weight of a polymer component comprising:
      (i) 5 to 100 parts by weight of a polymer selected from the group consisting of polyethylene in particulate form, polyvinyl chloride in particulate form, and a mixture of polyethylene and polyvinyl chloride both in particulate form; and
      (ii) 0 to 95 parts by weight of polystyrene in particulate form;
    (2) 10 to 70 parts by weight of a particulate extender; and
    (3) 0 to 40 parts by weight of reinforcing fibres or particles;
  (b) mixing the feedstock with 10 to 35 parts by weight of a thermosetting resin selected from the group consisting of:
    (i) an unsaturated polyester resin in liquid form and a catalyst for the polyester resin; and
    (ii) an epoxy resin in liquid form and a catalyst for the epoxy resin; and
  (c) subjecting the product of step (b) to suitable conditions of temperature and pressure to cause the polyethylene and/or the polyvinyl chloride and the polystyrene, if present, to melt and the thermosetting resin to set to form the finished product.

According to a second aspect of the invention there is provided a finished product comprising a feedstock comprising:
  (1) 10 to 40 parts by weight of a polymer comprising:
    (i) 5 to 100 parts by weight of a polymer selected from the group consisting of polyethylene in particulate form, polyvinyl chloride in particulate form, and a mixture of polyethylene and polyvinyl chloride both in particulate form; and
    (ii) 0 to 95 parts by weight of polystyrene in particulate form
  (2) 10 to 70 parts by weight of a particulate extender; and
  (3) 0 to 40 parts by weight of reinforcing fibres or particles; bound with 10 to 35 parts by weight of a thermosetting resin selected from the group consisting of:
    (iii) an unsaturated polyester resin in liquid form and a catalyst for the polyester resin; and
    (iv) an epoxy resin in liquid form and a catalyst for the epoxy resin.

Preferably, the feedstock comprises:
  (1) 15 to 35 parts by weight of the polymer component;
  (2) 15 to 50 parts by weight of the extender;
  (3) 0 to 25, preferably 10 to 25 parts by weight of the reinforcing fibres or particles;
  mixed with 15 to 25 parts by weight of the thermosetting resin.

It is to be noted that the finished product does not contain any hydraulic binder. In other words, the method of making the finished product is carried out without the use of a hydraulic binder and the final finished product does not include a hydraulic binder.

It is also to be noted that the method of the invention is carried out without the use of water at any stage.

The polymer component of feedstock may comprise polyethylene on its own, or polyvinyl chloride on its own, or a mixture of polyethylene and polyvinyl chloride without any other polymer, or any one of polyethylene, polyvinyl chloride or a mixture of polyethylene and polyvinyl chloride, together with an amount of polystyrene, all being in particulate form.

The polymer component of the feedstock preferably comprises:
  (i) 40 to 100 parts by weight of a polymer selected from the group consisting of polyethylene in particulate form, polyvinyl chloride in particulate form, and a mixture of polyethylene and polyvinyl chloride both in particulate form; and
  (ii) 0 to 60 parts by weight of polystyrene in particulate form.

The polymer component of the feedstock more preferably comprises:
  (i) at least 50 parts to 100 parts by weight of a polymer selected from the group consisting of polyethylene in particulate form, polyvinyl chloride in particulate form, and a mixture of polyethylene and polyvinyl chloride both in particulate form; and
  (ii) 0 up to 50 parts by weight of polystyrene in particulate form.

The polyethylene and/or polyvinyl chloride provides the finished product with impact and flexural strength while the polystyrene provides the finished product with rigidity and hardness.

Depending upon the end use to which the finished product is to be put, the relative quantities of polyethylene, polyvinyl chloride and polystyrene may be varied to give a finished product with the desired properties.

The polyethylene may be chosen from linear low density polyethylene through to high density polyethylene.

The polyvinyl chloride may be any suitable polyvinyl chloride and is preferably a polyvinyl chloride that has been compounded with a stabiliser to prevent decomposition at the temperatures used in the method of the invention, and with a lubricant to propagate flow prior to and during the polymerisation of the thermosetting resin and to blend with the other components of the composition.

The polystyrene is preferably milled polystyrene foam or polystyrene packaging.

The polyethylene, polyvinyl chloride and polystyrene must be in particulate form. By "particulate form" is meant round or flat particles, granules, and short fibres, all having a maximum dimension of 3 mm. The polyethylene, polyvinyl chloride and polystyrene are preferably used in powder form and preferably have a particle size of 1.0 mm diameter or less, more preferably 0.5 mm diameter or less.

The extender may be selected from the group consisting of a lightweight inorganic volume extender, a lightweight organic volume extender, and mixtures of two or more thereof.

The extender may also be milled mineral particles.

By a volume extender there is meant a particulate product with a low bulk density which when added to the composition of the invention increases its compression ratio, i.e the thickness of the product before pressing to the thickness of the product after pressing. The greater the compression ratio the greater is the control over product density, because the more the particles are pressed together, the better is the cohesion of the final product.

Volume extenders serve other useful functions including minimising lateral flow of the composition of the invention during compression moulding, as a function of its thermoplasticity.

In the composition of the invention, the use of volume extenders of different bulk densities and particle sizes allows for maximum flexibility in formulating a product for a particular application.

The lightweight volume extender may be selected from hollow glass balloons, milled expanded perlite particles, undensified silica fume, exfoliated vermiculite particles, cork particles, leather particles, and a mixture of two or more thereof.

The extender, as indicated above, may also be milled mineral particles selected from the group consisting of calcium carbonate particles, silica particles, expanded clay particles, and the like.

The reinforcing fibres or particles may be selected from inorganic or organic fibres or particles.

As indicated above, the thermosetting resin may be selected from the group consisting of an unsaturated polyester resin and an epoxy resin.

The preferred thermosetting resin is an unsaturated polyester resin in liquid form with a catalyst for the polyester resin, for the reasons of controlled temperature of polymerisation initiation and minimal volatile products on polymerisation.

The extender is most preferably an inorganic extender, so as to avoid problems associated with the use of organic extenders.

The method of the invention may include a step between step (b) and step (c), of placing the product of step (b) on a first length of a sheet material or between first and second lengths of a sheet material so that in step (c) the first length and the second length, if present, are incorporated into the finished product.

Alternatively, the method of the invention may include a step after step (c) of:

(a) placing the finished product on a first length of a sheet material or between first and second lengths of a sheet material with a layer of a thermosetting resin between the finished product and the first length and the second length, if present, and subjecting the resulting product to suitable conditions of temperature and pressure to laminate the first length to the finished product and to laminate the second length, if present, to the finished product, to form a composite product.

The sheet material may be for example a resin impregnated paper or a non-woven or woven fabric or the like, or a thermoplastic sheet material.

BRIEF DESCRIPTION OF THE DRAWINGS

FIG. 2A is a schematic view of a hydraulic press being used for the manufacture of a moulding for window frames of the invention;

FIG. 2B is a sectional side view of window frame mouldings manufactured in the hydraulic press of FIG. 2A;

FIG. 3 is a sectional side view of a wall stud of the invention;

FIG. 4 is a sectional side view of decking of the invention;

DESCRIPTION OF EMBODIMENTS

Figure 1A:
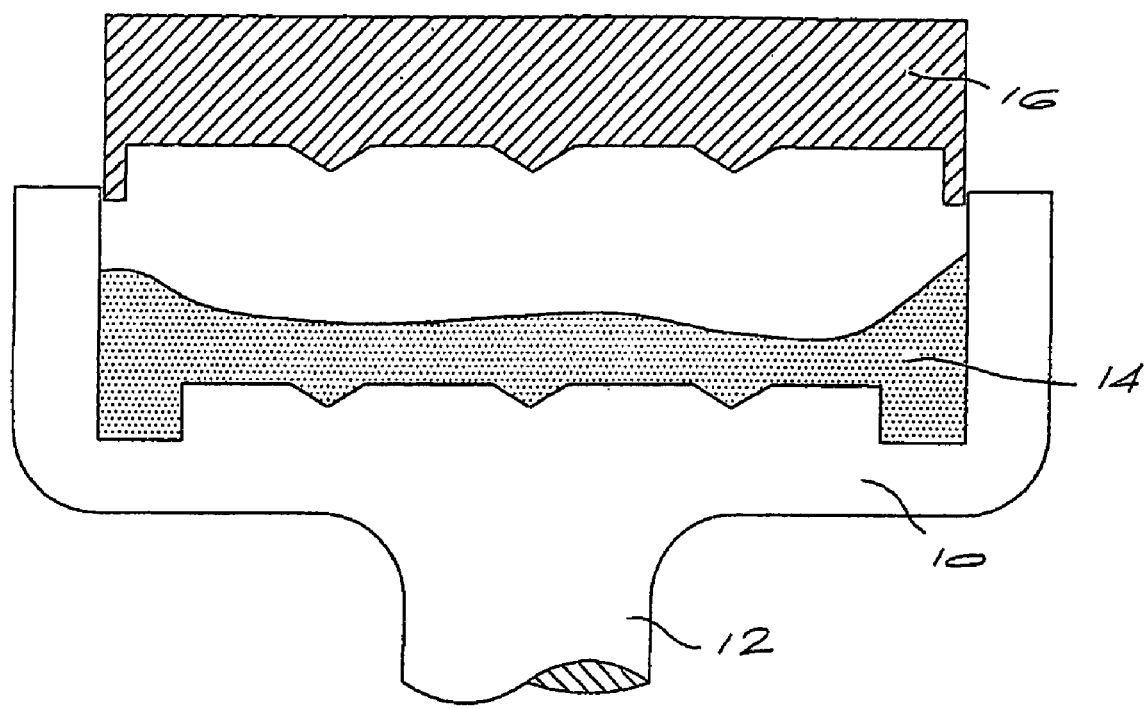
FIG. 1A is a schematic view of a hydraulic press being used for the manufacture of a door skin of the invention.

The crux of the invention is a method of making a finished product from a feedstock comprising a polymer component comprising polyethylene in particulate form and/or polyvinyl chloride in particulate form and optionally polystyrene in particulate form, an extender, and optionally reinforcing fibres or particles, by mixing the feedstock with a thermosetting resin and a catalyst for the resin. Thereafter the product is subjected to suitable conditions of temperature and pressure to cause the polyethylene and/or polyvinyl chloride and the polystyrene, if present, to melt and the thermosetting resin to set to form the finished product.

The first component is a feedstock comprising a polymer component comprising polyethylene and/or polyvinyl chloride and optionally polystyrene in particulate form.

The polyethylene may be for example a linear low density polyethylene for a finished product with toughness and flexibility or a high density polyethylene for a finished product with high rigidity.

The polyethylene may be either virgin polyethylene or, more preferably in terms of cost, be recycled or post industrial grade polyethylene, reduced to a relatively small particle size. When the polyethylene comes from a waste stream, it is acceptable for the waste stream and thus the polyethylene in the feedstock to contain a quantity of other polymers from the waste stream, such as, polyethylene terephthalate from bottles, polypropylene, polycarbonates, and polyesters. These additional waste polymers act as extenders for the feedstock in the finished product, as they generally have melting points higher than the temperatures used in step (c) of the method of the invention.

For example, polyethylene teraphthalate chips or fibres with a maximum dimension of 10 mm act advantageously as an extender in a finished product of the invention.

The polyethylene melts and commences to flow in the temperature range of from 115° C. to 140° C. inclusive.

The polyethylene must be in particulate, preferably powder form. Preferably, the polyethylene particles have a particle size of 1.0 mm in diameter or less, more preferably 0.5 mm in diameter or less, most preferably 150 microns in diameter or less.

The polyvinyl chloride may be for example a polyvinyl chloride that has been compounded with a stabiliser to prevent decomposition at the temperatures used in the method of the invention and with a lubricant to propagate flow prior to and during the polymerisation of the thermosetting resin and to blend with the other components of the composition. An example of a suitable polyvinyl chloride is DB178 by Polifin Division of Sasol, South Africa.

The properties of DB178 extrusion grade PVC are:

| PROPERTIES | UNIT | TYPICAL VALUE | TEST METHOD |
|---|---|---|---|
| Relative Density | | 1.43 | SABS Method 649 |
| Shore D Hardness | | 83 | ASTM D2240 |
| Vicat Softening Point | °C. | 85 | ASTM D1525 |
| Tensile Strength | N/mm$^2$ | 38 | BS2782 - 1970 |
| Elongation | % | 49 | BS2782 - 1970 |
| Volume Resistivity @ 23° C. | Ωcm | 28 × 10$^{15}$ | ASTM D257 |
| Fire Rating | | Self extinguishing | |
| Ash Content @ 650° C. | % | 4.30 | |

The polyvinyl chloride melts and commences to flow in the temperature range of from 150° C. to 185° C.

The polyvinyl chloride must be in particulate, preferably powder form. Preferably, the polyvinyl chloride particles have a particle size of 1.0 mm in diameter or less, more preferably 0.5 mm in diameter or less, most preferably 150 microns in diameter or less.

The polystyrene is preferably milled polystyrene foam or polystyrene packaging from a waste stream.

Polystyrene is a clear glass-like material manufactured by the free radical polyimerisation of phenylethene using benzoyl peroxide as an initiator. It has excellent thermal and electrical insulation properties and, in the method of the invention after having melted, it sets on cooling to a very hard inflexible, glass-like solid which is extremely resistant to water, having a water absorption after 24 hours of immersion of less than 0.06% by weight.

The polystyrene melts and commences to flow in the temperature range of from 100° C. to 140° C. inclusive.

The polystyrene must be in particulate, preferably powder form. Preferably, the polystyrene particles have a particle size of 1.0 mm in diameter or less, more preferably 0.5 mm in diameter or less, most preferably 150 microns in diameter or less.

The properties of polyethylene, polyvinyl chloride polystyrene and other polymers are set out in the table below.

Typical physical and mechanical comparisons between thermoplastics at 23° C. are as follows:

| Material | Density (g/cm$^3$) | Degree of Crystallinity | Coefficient of Thermal Expansion Comparisons | Glass Transition Temp. (° C.) |
|---|---|---|---|---|
| Polyethylene High-density | 0.95–0.97 | high | 8.3–16.7 | −120 |
| Polyethylene Low-density | 0.92–0.93 | moderate | 8.9–11.0 | −120 |
| Polypropylene | 0.90–0.91 | high | 6.2 | −20 |
| Polystryene | 1.0–1.1 | nil | | 100 |
| Polyvinyl Chloride Unplasticized (PVC) | 1.3–1.6 | nil | 2.8–3.3 | 85 |
| Polytetrafluoroethylene | 2.1–2.2 | moderate to high | | 126 |

| Material | Crystal Melting Temp (° C.) | Tensile Strength (MPa) | Elongation at Break (%) | Flexural Modulus (GPa) |
|---|---|---|---|---|
| Polyethylene High-density | 137 | 20–30 | 10–1000 | 1–15 |
| Polyethylene Low-density | 110 | 8–30 | 100–650 | 0.25–0.35 |
| Polypropylene | 176 | 30–40 | 100–600 | 1.2–1.7 |
| Polystyrene | — | 35–50 | 1–2 | 2.6–3.4 |
| Polyvinyl Chloride Unplasticized (PVA) | — | 40–50 | 2–80 | 2.1–3.4 |
| Polytetrafluroroethylene | 327 | 20–35 | 200–400 | 0.5 |

The feedstock also includes an extender.

The extender may be a lightweight inorganic volume extender such as hollow glass balloons, generally sourced from ground coal firing, which are siliceous, with a low bulk density in the range of from 200 g/l to 300 g/l and with a particle size in the range of from 50 to 300 microns, an example being Fillite SG; or milled expanded perlite particles such as Dicalite 411 or 471 by Chemserve Perlite South Africa, which has a similar bulk density to hollow glass micro balloons; or undensified silica fume with a bulk density in the range of 200 g/l to 300 g/l; or exfoliated vermiculite particles such as RSU by Palaborwa or MCF by Imerys, preferably with a particle size of less than 300 micron.

The extender may also be a lightweight organic volume extender such as particles of cork or leather with bulk densities in the range of from 150 to 250 g/l inclusive.

The extender may also be milled mineral particles such as for example calcium carbonate, silica or expanded clay particles.

The extender may be a blend of two or more of the above.

The purpose of adding an extender to the feedstock is to control the density of the finished product with a minimum reduction in stiffness, and to minimise the coefficient of linear expansion in order to achieve acceptable dimensional stability, to improve stiffness and impact resistance, and to reduce cost.

The extender is preferably an inorganic extender selected from those set out above.

The most preferred extenders are selected from the group consisting of hollow glass balloons, expanded clay particles, exfoliated vermiculite particles and expanded perlite particles.

The feedstock may also comprise reinforcing inorganic particles or fibres such as glass fibre, either milled or up to 16 mm in length, but preferably of the order of 12 mm in length for best distribution and reinforcing; platelet minerals such as mica, preferably with a particle size in the range of 8 to 100 mesh, more preferably about 40 mesh, or phlogopite; or rod-like particles such as wollastonite.

The feedstock may also comprise reinforcing organic particles or fibres such as lignocellulosic fibres, e.g typha reed fibres, kenaf, flax, sisal and wood; or synthetic fibres such as polyester fibres capable of withstanding pressing temperatures in excess of 160° C.

The reinforcing fibres may be a blend of two or more of the above.

The next component is a thermosetting resin.

The first thermosetting resin which may be used is an unsaturated polyester resin in liquid form and a catalyst for the polyester resin.

An example of a suitable polyester resin is a high reactivity resin for hot pressed dough moulding compound applications (DMC), which resin is an orthophthalic, unsaturated polyester resin designed for use in the manufacture of glass and aggregate filled dough moulding compounds. It may be used in conjunction with low profile/low shrink additives for zero or low shrink hot press moulded products. Typical properties of this resin are a viscosity at 25° C. of 1470 mPa·s, a volatile content of 35.5%, and a curing characteristic at 126° C. using one part per hundred of Triganox 29B50 catalyst of a five minute gel time.

Another suitable resin is a chemical and water resistant isophthalic, neo-pentyl glycol unsaturated polyester resin used for high performance laminates. An example of this resin is NCS 993 by NCS Resins South Africa, which has a viscosity at 25° C. of 540 to 800 mpa·s, an acid value of 10 to 16 mgKOH/g, a volatile content of 39 to 43%, which may be cured with a latent catalyst such as Triganox 29B50 which is a benzoyl peroxide.

Other suitable polyester resins include Crystic 272 and Crystic 196 from Scott Bader, England, catalysed by catalyst powder B; those sold under the Atlac brand from DSM; Polyite 33410, Polylite 8130, Polylite 8000 and Polylite 8382X from National Chemical Products, South Africa, catalysed with di-tert-butyl peroxy 3,3,5-tri-methylcyclohexane in dibutyl phthalate such as Triganox 29B240, Lucidol KL50, Triganox 21, Triganox C or Triganox K-70, benzoyl peroxide formulations, t-butyl perbenzoate from Interox, e.g Codes TBTB and TBPB, dibenzoyl peroxide from Interox Code BP.50-FT, and methyl isobutyl ketone peroxide from Interox under Code MIKP NA1. These catalysts generally trigger polymerisation at a temperature in the region of 60° C. upwards, more typically 80° C. upwards.

The catalyst for the unsaturated polyester resin is preferably used in an amount of from 0.5% to 2.5% to 100% of the unsaturated polyester resin on a weight basis.

The second thermosetting resin which may be used is an epoxy resin in liquid form and a catalyst for the epoxy resin. A preferred epoxy resin is a low viscosity liquid epoxy resin manufactured from epichlorohydrin and bisphenol F. Typical examples of such resins include those manufactured by Shell Chemical Company under the names Epikote 816, 862, 232, 235 and 236, and those manufactured by Ciba-Geigy AG under the names XD.4150, XSA.214, Araldite AZ.15 and Araldite PY.340-2. Other suitable epoxy resins include epoxy resins with blocked amine functions, such as the reaction product of phthalic anhydride with diethylene triamine.

Suitable latent catalyst systems for use with epoxy resins include those catalyst systems supplied by Anchor Chemicals (UK) Limited such as Ancamine 2014S which is a modified polyamine; Anchor/catalyst 1786B which is 50/50 solution of p-toluene sulphonate of 2-amine-2-methyl-1-proponal in n-butanol.

These catalysts generally trigger polymerisation at a temperature of around 80° C. or upwards.

The unsaturated polyester resin may optionally be mixed with up to 50% by weight of the polyester resin of a styrene monomer for viscosity modification.

In order to propagate the adhesion between the polyethylene, polyvinyl chloride and polystyrene, i.e to induce the formation of a physical co-polymer between them and in order to impose upon the finished product improved toughness, and shock resistance when polystyrene is used in relatively large proportions, the product of the invention may include a thermoplastic elastomer, also known as a thermoplastic rubber or block co-polymer.

The thermoplastic elastomer is preferably used in an amount of from 2.5% to 35.0% based on 100% by weight of the polystyrene present.

The thermoplastic elastomer is preferably dissolved in a styrene monomer to produce a saturated solution. This saturated solution is then preferably blended with the thermosetting resin and its catalyst before this is added to the feedstock.

Examples of suitable thermoplastic elastomers are those having styrene end blocks and an elastomeric mid-block such as for example butadiene, isoprene, ethylene and the like, i.e those that have two different polymers in each molecule. Thus for example, suitable thermoplastic elastomers include a styrene/butadiene/styrene polymer, a styrene/isoprene polymer, and an acrylonitrile/butadiene/styrene polymer. The preferred thermoplastic elastomers are the styrene/butadiene polymers. Specific examples of suitable thermoplastic elastomers are the Kraton grades by Shell Chemicals. The "D" series are unsaturated and suitable for interior application and are comprised of styrene/isoprenelstyrene block copolymers which are linear, and styrene/butadiene radial copolymers. The "G" series are fully hydrogenated grades for exterior applications and include styrene-ethylene/butylene-styrene block co-polymers which are linear and styrene-ethylene/propylene di-block polymers. The Kraton "G" range of thermoplastic elastomers possess excellent resistance to oxygen, ozone and UV light degradation.

In addition, the propagation of adhesion between the thermosetting resin, polyethylene, polyvinyl chloride and polystyrene and any inorganic extender present may be further induced by the use of a silane coupling agent or crosslinker. An example is DC 1107 by Dow Corning used in an amount of about 0.5% on the weight of the thermosetting resin. This is a solvent soluble polymethylhydrogen siloxane. A further example is a gamma-methacryloxypropyltrimethoxy silane, Silquest A.174 silane by Witco Corporation which is specific to polyolefin to polyester to inorganic linkage, used in an amount of 0.1% by weight of the total composition.

In an alternative step, after step (c) the finished product may be placed on a first length of a sheet material or between first and second lengths of a sheet material, with a layer of a suitable thermosetting resin between the first length and the second length, if present, and the finished product, whereafter the whole is subjected to suitable conditions of temperature and pressure to laminate the first and second lengths of the sheet material to the finished product to form a composite product.

In step (b) of the method of the invention, the feedstock and the thermosetting resin are mixed.

It is to be noted that the finished product of the invention contains no hydraulic binder such as Portland cement.

In step (c) of the method of the invention, the product of step (b) is subjected to suitable conditions of temperature and pressure to cause the polyethylene and/or polyvinyl chloride and polystyrene, if present, to melt and the thermosetting resin to set to form the finished product.

Suitable conditions of temperature and pressure include a temperature of from 110 to 200° C. inclusive and a pressure of from 10 to 50 kg/cm² inclusive. For example, the product of step (b) may be laid up between the platens of a press, and pressed to form a finished board product.

The exotherm from the thermosetting resin polymerization can elevate the composition temperature to above that of the platen temperature. Cooling of the product prior to releasing press platen contact is desirable to allow full strength and stability of the product to develop before handling.

Alternatively, the product of step (b) may be placed in a suitable mould and moulded to form a finished moulded product.

Further alternatively the product of step (b) may be extruded.

In a variation of the method of the invention, between step (b) and (c), the product of step (b) may be placed on a first length of a sheet material or between first and second lengths of a sheet material so that in step (c) the first length and the second length, if present, are incorporated into the finished product.

For example, the product of step (b) may be placed between first and second lengths of a sheet material, each length consisting of single or multi layers of a resin impregnated paper, preferably saturating Kraft paper impregnated with a resin selected from:

1. An unsaturated polyester resin with a catalyst therefor, optionally extended with a styrene monomer, in a solvent such as acetone. An example of a suitable unsaturated polyester resin is a neo-pentyl glycol unsaturated polyester resin, viz. NCS 993 by NCS Resins South Africa, in acetone, optionally including up to 10% by weight of a styrene monomer and also containing 0.5% to 2.5% by weight of the polyester resin of Triganox 29B50 catalyst.
2. A phenol formaldehyde resole resin such as Code J2018L by Borden Chemical Corporation, with an acid catalyst such as Phencat 10, (preferably in an amount of about 6% by weight of the resin) in methanol.
3. An MDI which is a diphenylmethane-4,4-diisocyanate, for example Suprasec 5005 or 2447 by Huntsman Corporation, optionally including a catalyst, in a suitable solvent such as acetone, ethyl acetate or dichloromethane The sheets of paper are impregnated with the resin system, whereafter the solvent is removed.

In step (c), the impregnated lengths of paper are then incorporated into the product of step (b) using suitable conditions of temperature and pressure as described above.

The Kraft paper preferably has a weight of about 200 to 400 g/m² and a thickness of approximately 350 to 500 microns.

Alternatively, and particularly where the finished product is to be shaped, for example to form a corrugated pallet deck, a non-woven fibrous sheet, preferably made of a polyester or polyethylene teraphthalate, which both have melting points in excess of 245° C., may be used in place of the Kraft paper. These non-woven fibrous sheets may optionally be pre-impregnated with the same impregnating compositions described above for paper.

An example of a suitable non-woven fibrous material is Bidim Geotextile by Kaytech (Code A2 to Code A6) with a weight of 150 to 340 g/m², a tensile strength of 11 to 30 kNm, an elongation of 40% to 60% (which is necessary in pressing a shape to allow the accommodation of the increased surface area during compression moulding), and a melt temperature of about 250° C.

Other examples of a suitable sheet material are a chop strand matt glass fibre sheet of a mass of 300 to 600 g/m, sheet aluminium, and a melamine type high pressure laminate.

Again, the first and second lengths of a sheet material may be lengths of resin impregnated paper as described above.

The thermosetting resin for this purpose may be an unsaturated polyester resin, a phenol formaldehyde resole resin, or an MDI, preferably thickened with a suitable thickener such as Aerosil, or silica fume. The preferred thermosetting resin is an unsaturated polyester resin.

Once the composite product has been made as described above, further outer layers may be attached to the composite product. For example, on one or both sides of the composite product there may be attached an outer layer of a finished product of the invention.

Thus for example, there may be made a product comprising the following layers one on top of another:

an outer layer being a finished product of the invention formed from a linear low density polyethylene and an unsaturated polyester resin which has set;

an intermediate layer being a sheet of paper impregnated with a resin as described above;

a core being a finished product of the invention formed from a high density polyethylene and an unsaturated polyester resin which has set;

an intermediate layer of a sheet of paper impregnated with a resin as described above; and an outer layer being a finished product of the invention formed from a linear low density polyethylene and an unsaturated polyester resin which has set.

Any one of the layers may also include an amount of polystyrene. Examples of the invention will now be given.

EXAMPLE 1

A feedstock is prepared by mixing the following:

| | |
|---|---|
| Irradiated high density polyethylene | 700 parts by weight |
| Mica 40 mesh | 200 parts by weight |
| Cenolite hollow glass balloons, 80 to 300 micron particle size | 300 parts by weight |

The feedstock is mixed with:

| | |
|---|---|
| Isophthalic polyester resin, NCS 993 (NCS Resins) | 400 parts by weight |
| Catalyst, Triganox 29B50 | 6 parts by weight |
| Styrene monomer | 60 parts by weight |

The mixture is pressed at a temperature of 160° C. to a thickness of 11 mm at a density of 825 kg/m³ between first and second lengths of a sheet material, each of the first and second lengths comprising four sheets of resin impregnated Kraft paper with the weight of 200 g/m² per sheet.

The paper was impreganted with a composition comprising:

| | |
|---|---|
| Isophthalic polyester resin, NCS 993 (NCS Resins) | 20 parts by weight |
| Catalyst, Triganox 29B50 | 0.04 parts by weight |
| DC1107 cross-linking siloxane (Dow Corning) | 0.20 parts by weight |
| Acetone | 79 parts by weight |
| Accelerator, NCS ACI (NCS Resins) 0.06% of cobalt octoate in white spirit solution | 0.10% parts by weight |

The solvent is then removed.

A layer of a thermosetting resin is located between the first and second lengths and the product, viz. NCS 993 isophthalic polyester resin (NCS Resins), catalysed with 1.5% Triganox 29B50 and thickened with Aerosil by Degussa. The result is a composite product with a thickness of 15 mm.

The composite product of the invention was tested under load in comparison to a 15 mm birch plywood.

The following test data for a sample with dimensions of 300 mm×300 mm was obtained.

| Maximum applied load - 806 kgf (7907N) | |
|---|---|
| Deflection of board of the invention at maximum load | 7.8 mm |
| Deflection of board of the invention at working load | 4.45 mm |
| % strength compared to the 15 mm birch plywood based on the ultimate load | 132% |
| % strength compared to the 15 mm birch plywood based working load deflection | 106% |

EXAMPLE 2

An example of a composite suitable for siding or door skins is as follows:

| | PERCENTAGE | WEIGHT UNIT |
|---|---|---|
| PVC DB178 (Sasol) | 37 | 900 |
| Fillite SG (Runcorn UK) | 17 | 400 |
| Mica 20 mesh | 29 | 700 |
| Orthophthalic Polyester Resin unsaturated Code 901 (NCS South Africa) | 17 | 400 |
| 29B50 Triganox (Akzo Chemie) | — | 4 |
| DC 110 (Dow Corning) | — | 4 |

The board is pressed to a density of 1100 kg/m$^3$ at a platen temperature of 185° C. for 8 minutes to a thickness of 8 mm to produce a very strong composite of excellent dimensional stability.

EXAMPLE 3

An example of a composition suitable for the production of high performance boards is as follows:

| Component | Parts by weight |
|---|---|
| Polystyrene Packaging Waste Grade | 150 |
| Polyethylene High Density | 700 |
| Mica 40 Mesh | 600 |
| Hollow Glass Balloons | 200 |
| 901 PA Resin Orthophthalic Unsaturated Polyester NCS | 675 |
| 29B50 Triganox | 8 |
| Silane Cross Linker Dow Corning (Adhesion Promoter) | 6 |
| Glass Fibre 12 mm length | 1000 |
| TOTAL | 3339 |

The particle size of the polystyrene particles is 0.5 mm diameter and of the polyethylene is 80 mesh.

The above composition was mixed and then pressed at a pressure of 22 kg/cm$^2$ and at a temperature of 160° C. for eight minutes to a thickness of 12 mm and a density of 1200 kg/cm$^3$.

A board so produced was tested as a monolithic 12 mm board against a 12 mm 9 ply birch plywood board bonded with phenolic resins and surfaced with a B-stage phenolic resin over the placement sheet on both surfaces. The results are set out below.

| Property | Unit | Board of Invention | 12 mm 9 ply birch Shutter board |
|---|---|---|---|
| Tensile Strength | MPa | 18.1 | 54.3 |
| Tensile Modulus | MPa | 534 | 1601 |
| Flexural Strength | MPa | 67.4 | 43.8 |
| Flexural Modulus | MPa | 2053 | 1063 |
| Lap Shear | MPa | 4.1 | 15.5 |
| Water Absorption (Inc. 24 hrs) | % | 0.176 | 30.89 |
| Water Absorption (Inc. 7 days) | % | 1.017 | 49.02 |
| Area - (Inc. 24 hours) | % | 0.100 | 1.477 |
| Area - (Inc. 7 days) | % | 0.139 | 1.929 |
| Thickness - (Inc. 24 hrs) | % | 0.353 | 3.658 |
| Thickness - (Inc. 7 days) | % | 0.441 | 6.983 |

Inc. 24 hrs means increase after 24 hours

The flexural strength and modulus of the board of the invention were respectively 1½ times and 2 times higher than that of the birch ply shutter board.

Various examples of finished products of the invention will now be described with reference to the accompanying drawings.

Referring to FIG. 1A there is shown a platen 10 of a hydraulic press 12 for pressing a profiled shape. A mixture of the feedstock of the invention with an unsaturated polyester resin in liquid form and a catalyst for the polyester resin, is placed as a layer 14 on the platen 10. A profiled mould 16 is then used to press the mixture 14 to form a door skin moulding illustrated as 18 in FIG. 1B.

Figure 1B:
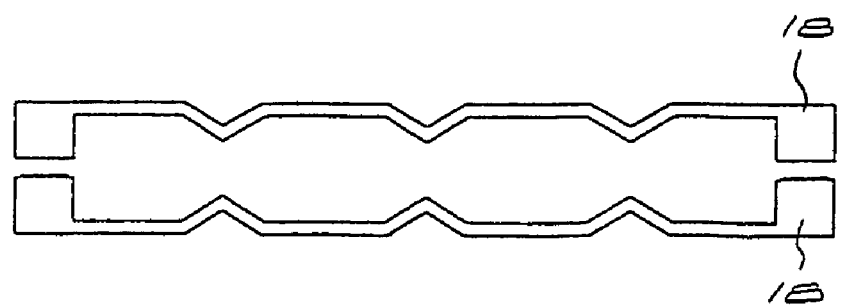
FIG. 1B is a side view of two door skins manufactured in the hydraulic press of FIG. 1A.

As can be seen from FIG. 1B, two door skin mouldings 18 may be joined to each other. A polyurethane foam may be injected into the space between them to product a polyethylene composite exterior door.

Referring to FIG. 2A there is again shown a platen 20 of a hydraulic press 22 for pressing a profiled shape. A mixture of the feedstock, polyester resin and catalyst of the invention as described above is placed as a layer 24 on the platen 22. A profiled mould 26 is used to press the mixture 24 into the mould shapes 28. The mixture 24 first melts and then flows into the mould shapes 28 and then sets to form a moulding 30 illustrated in FIG. 2B.

The moulding 30 may be cut into sections 32 for use as window frames.

The unsaturated polyester resin may be replaced by an epoxy resin to produce similar products:

Referring to FIG. 3 there is shown a wall stud 40 made by the method of the invention which may be used in place of a typical 4 inch×2 inch (10.16 cm×5.08 cm) stud of timber. The stud 40 of the invention has a volume advantage over such a conventional timber stud of 25:1 but still has a density of 0.95 giving it adequate strength.

Referring to FIG. 4 there is shown a sectioned side view of a length of decking 50, made by compression moulding according to the method of the invention.

Figure 5B:
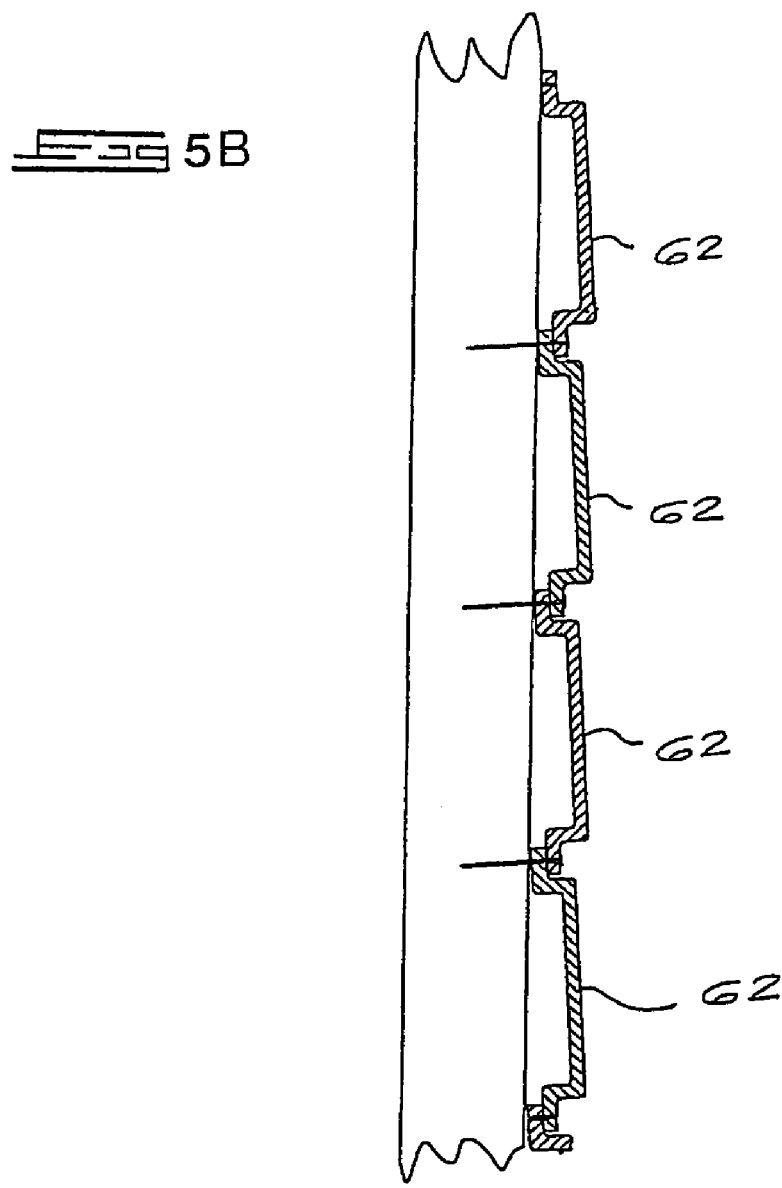
FIG. 5B is a sectional side view of an assembly of the siding strips of FIG. 5A.
Figure 5A:
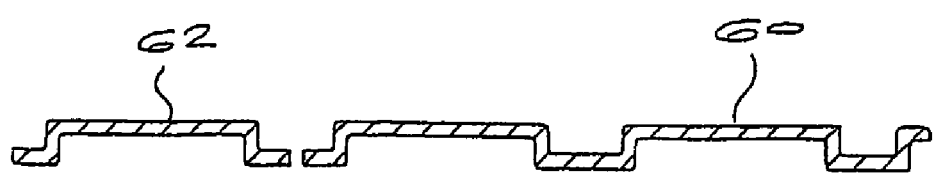
FIG. 5A is a sectional side view of a sheet which may be cut to form siding strips of the invention.

Referring to FIG. 5A there is shown a sectioned side view of a sheet 60 made by the method of the invention which may be cut to form siding strips 62.

Referring to FIG. 5B, the siding strips 62 may be used in a conventional manner to provide a siding assembly.

Other finished products of the invention Include corrugated roof sheeting, roof rafters and beams, dismountable bulk handing bins, pallets, stiles and rails for doors, window and door sills, shutter boards or form boards, and the like.

The finished products of the invention have the following advantages.

Polyethylenes, as used in extrusion or other processing, require to be cooled before solidification. The use of a polyester in the formulation of the invention allows the polyethylene first to flow, the catalyst then decomposes, and the polyester sets. The finished product so made has no memory, retains its shape, and may be demoulded at or near the process temperature.

By combining a thermoplastic material in dry powder form and a thermosetting resin in liquid form, there is no need for pre-compounding and thus much greater formulation flexibility can be achieved in terms of the quantity and type of extenders that may be included.

As the polyester resin used is reactive, as compared with polyethylene which is not reactive, the finished product of the invention may be painted or glued. This is not possible with an unmodified polyethylene product.

The finished products of the invention have considerable strength as a result of the materials used therein. In particular the thermosetting resin provides the strength needed for the heterogeneous nature of the thermoplastic resin(s) from a waste stream.

Polyesters and epoxies on polymerisation do not produce a gas, as do other resins such as phenol formaldehyde resole resins and isocyanate resins, which leads to processing advantages, such as the absence of porosity or blistering.

Because the mixture produced by blending the feedstock with the polyester or epoxy resin has the properties of both a thermoplastic and a thermoset material, in compression moulding this mixture may be induced to flow into shapes at a final density gradient of from 0.8 to 1.2, i.e 800 to 1200 kg/m$^3$ without materially diminishing the functionality of the finished product. Thus, far greater process flexibility can be achieved than would be possible by extrusion.

Polyethylene based extrusions or compression mouldings that contain extenders much beyond 20% by weight of the final product exhibit a dramatic loss of strength as a function of lack of compatibility or adhesion between the polyethylene and the extender. The use of a thermosetting resin in the finished product of the invention overcomes these problems.

The polyethylene and polystyrene used in manufacture of the finished product of the invention may both be derived from waste product streams, with cost advantages.

The invention claimed is:

1. A method of making a finished product comprising the steps of:
   a. providing a feedstock which has,
      (1) 10 to 40 parts by weight of a polymer component comprising,
         (i) 5 to 100 parts by weight of polyethylene in particulate form, and
         (ii) 0 to 95 parts by weight of polystyrene in particulate form,
      (2) 20 to 70 parts by weight of a particulate, lightweight volume extender which has a bulk density range of from 150 grams per liter to 300 grams per liter, and
      (3) 0 to 40 parts by weight of reinforcing fibers or particles;
   b. mixing the feedstock with 10 to 35 parts by weight of an unsaturated polyester thermosetting resin in liquid form and a catalyst for the thermosetting resin; and
   c. subjecting the product of step b. to conditions of temperature between 140° C. and 180° C. and conditions of pressure to cause the polyethylene and the polystyrene, if present, to melt and the thermosetting resin to set to form the finished product.

2. The method according to claim 1, wherein:
   (a) the feedstock comprises,
      (1) 15 to 35 parts by weight of the polymer component,
      (2) 25 to 50 parts by weight of the volume extender, and
      (3) 0 to 25 parts by weight of the reinforcing fibers or particles; and
   (b) which is mixed with 15 to 25 parts by weight of the thermosetting resin.

3. The method according to claim 1, wherein the polyethylene is in powder form and has a particle size of 1.0 mm diameter or less.

4. The method according to claim 1, wherein the volume extender is selected from the group consisting of a lightweight inorganic volume extender, a lightweight organic volume extender, milled mineral particles, and mixtures of two or more thereof.

5. The method according claim 1, wherein the volume extender is selected from the group consisting of undensified silica fume, exfoliated vermiculite particles, silica particles and a mixture of two or more thereof.

6. The method according to claim 1, wherein the volume extender is in the form of exfoliated vermiculite particles with a particle size of less than 300 micron.

7. The method according to claim 1, wherein the reinforcing fibers or particles are selected from the group consisting of polyester fibers, glass fibers, mica particles, phlogopite particles, lignocellulosic fibers and a mixture of two or more thereof.

8. The method according to claim 1, wherein the reinforcing fibers or particles are in the form of lignocellulosic fibers.

9. The method according to claim 1, wherein in step c. the product of step b. is subjected to a pressure of from 10 kg/cm$^2$ to 50 kg/cm$^2$ inclusive.

10. The method according to claim 1, further comprising a step between steps b. and c. of placing the product of step b. between first and second lengths of sheet material so that in step c. the first length and the second length are incorporated into the finished product.

11. The method according to claim 10, wherein the sheet material is in the form of a resin impregnated woven fabric.

12. The method according to claim 10, wherein the resin impregnated woven fabric comprises a glass fiber sheet.

13. A method of making a finished product comprising the steps of:
  a. providing a feedstock which has,
    (1) 15 to 35 parts by weight of a polyethylene polymer component which is in particulate form,
    (2) 20 to 70 parts by weight of exfoliated vermiculite particles which have a bulk density range of from 150 grams per liter to 300 grams per liter as a volume extender, and
    (3) 0 to 25 parts by weight of lignocellulosic fibers as reinforcing fibers,
  b. mixing the feedstock with 10 to 35 parts by weight of an unsaturated polyester thermosetting resin in liquid form and a catalyst for the thermosetting resin; and
  c. subjecting the product of step b. to conditions of temperature between 140° C. and 180° C. and conditions of pressure of from 10 kg/cm$^2$ to 50 kg/cm$^2$ inclusive to cause the polyethylene to melt and the thermosetting resin to set to form the finished product.

14. The method according to claim 13, further comprising a step between steps b. and c. of placing the product of step b. between first and second lengths of sheet material so that in step c. the first length and the second length are incorporated into the finished product.

15. The method according to claim 14, wherein the sheet material is in the form of a resin impregnated woven fabric.

16. The method according to claim 15, wherein the resin impregnated woven fabric comprises a glass fiber sheet.

17. A method of making a finished product comprising the steps of:
  a. providing a feedstock which has,
    (1) 15 to 35 parts by weight of polyethylene in particulate form,
    (2) 20 to 70 parts by weight of exfoliated vermiculite particles which have a bulk density range of from 150 grams per liter to 300 grams per liter as a volume extender, and
    (3) 0 to 25 parts by weight of lignocellulosic fibers as reinforcing fibers;
  b. mixing the feedstock with 10 to 35 parts by weight of an unsaturated polyester thermosetting resin in liquid form and a catalyst for the thermosetting resin;
  c. placing the product of step b. between first and second lengths of resin impregnated woven fabrics; and
  d. subjecting the product of step c. to conditions of temperature between 140° C. and 180° C. and conditions of pressure of from 10 kg/cm$^2$ to 50 kg/cm$^2$ inclusive to cause the polyethylene to melt and the thermosetting resin to set to form the finished product and to cause the first length and the second length to be incorporated into the finished product.

18. A finished product comprising:
  a polyethylene polymer component;
  exfoliated vermiculite volume extender particles which have a bulk density range of from 150 grams per liter to 300 grams per liter;
  reinforcing fibers;
  an unsaturated polyester thermosetting resin; and
  first and second lengths of sheet material.

19. The finished product according to claim 18, wherein the reinforcing fibers comprise lignocellulosic reinforcing fibers.

20. The finished product according to claim 18, wherein the sheet material comprises glass fiber sheets.

* * * * *